Patented Feb. 26, 1935

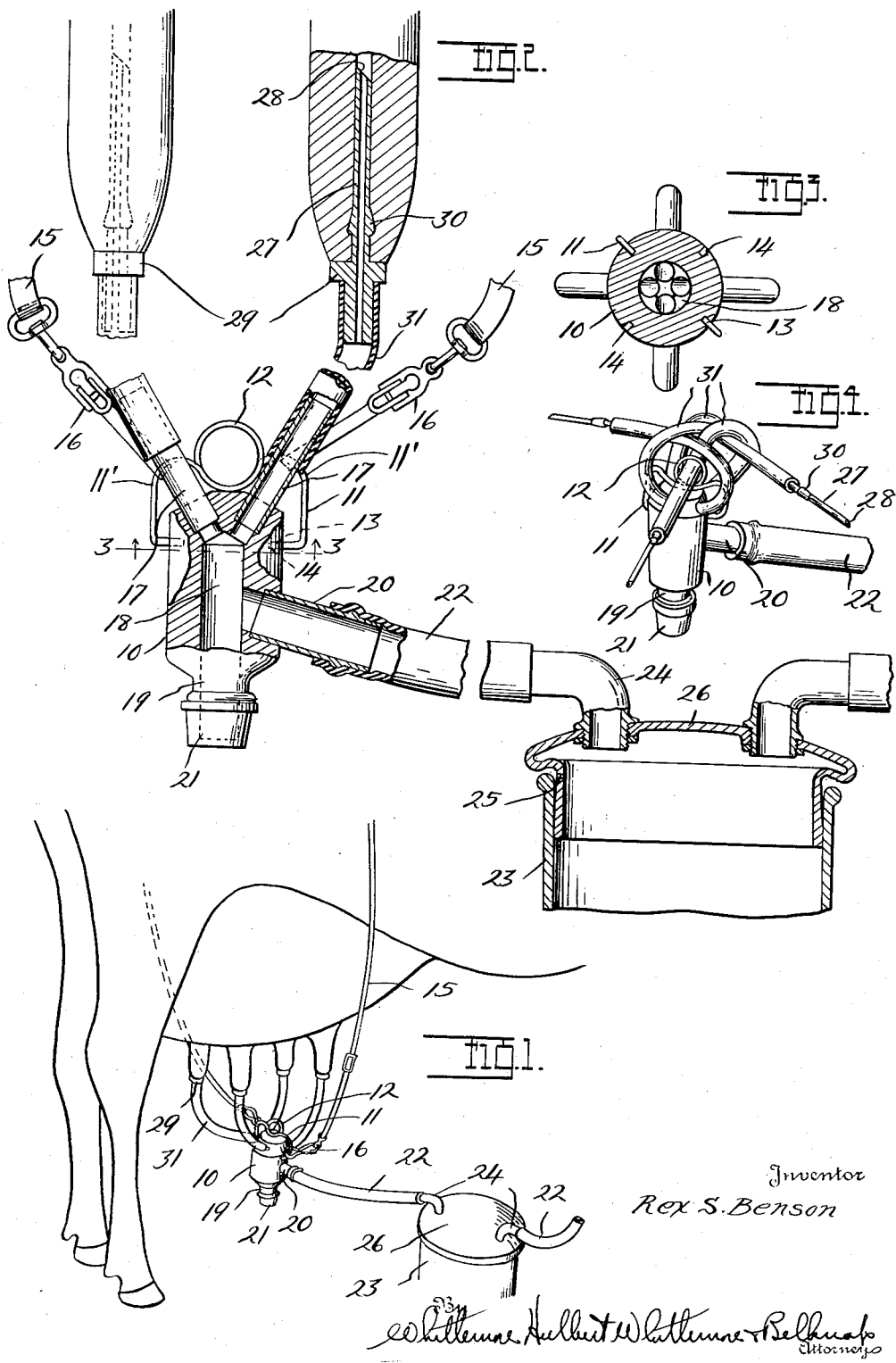

1,992,807

UNITED STATES PATENT OFFICE 1,992,807

GRAVITY TYPE MILKING DEVICE

Rex S. Benson, Detroit, Mich.

Application May 9, 1932, Serial No. 610,274

4 Claims. (Cl. 31—60)

This invention relates to a milking device for cows, and has as its object to provide an improved construction of gravity type milking device.

An object of my invention is to provide a milking device employing teat tubes which are introduced into the teats for drawing or delivering the milk from the udder or bag without manipulation of the teats.

In the prior art, it has heretofore been known to employ teat tubes which are closed at the end inserted in the teat, and which are provided with openings or perforations in the sides of the tube. In teat tubes of this type, the teat closes in against the openings and prevents the free flow of milk from the udder. Furthermore, with teat tubes of this type it is difficult to quickly clean and sterilize the tubes.

In accordance with my invention, I provide a teat tube having a longitudinal passageway extending therethrough and open at both ends so that the milk from the udder or bag may be thoroughly drained therefrom and flow easily into the teat tube.

The invention further contemplates taking advantage of the muscles that surround the lower ends of the teats by forming an enlargement on each teat tube which is disposed in the teat passage just above these muscles so that when the teat tube is inserted the muscles of the teat contract around the tube below the enlargement and assist in holding the tube properly within the teat.

The invention also contemplates means associated with each teat tube for abutting engagement with the end of the teat to limit the insertion of the tube.

My improved milking apparatus also includes a junction member provided with a plurality, usually four, of nipples by means of which connection is made by short lengths of hose to the teat tubes, the junction member being also provided with a downward extending discharge opening and a laterally extending discharge opening with which may be connected therewith a hose for conveying the milk to a container.

My improved milking device also includes a bail member by means of which a supporting strap may be connected for hanging the milking device on to a cow's back, said bail member being provided with means for securing the hose connections to the teat tubes in interlaced positions when the milking device is not in use, or is being attached to a cow.

The several objects, advantages and novel details of this construction will be made more apparent as this description proceeds, especially when considered in connection with the accompanying drawing, wherein Figure 1 is a fragmentary elevational view of my improved milking device;

Figure 2 is an enlarged fragmentary sectional view through the structure;

Figure 3 is a detail sectional view taken substantially on a plane indicated by line 3—3 of Figure 2, and Figure 4 is a fragmentary perspective view of the junction member with the teat tubes and their hose connections interlaced in inoperative position.

Referring now more particularly to the drawing wherein like references indicate like parts, it will be noted that there is illustrated a junction or union member 10 provided with a bail member 11, the bail member having a ring portion 12 associated therewith. The bail member 11 is preferably of spring wire stock so that its ends 13 may be snapped into either of the pair of opposed recesses 14 in the junction member. The reference character 15 indicates a supporting strap provided at its ends with detachable connections 16, by means of which the strap may be engaged around the back of the cow, and the ends engaged with the bail 11 to support the milking device and particularly the junction member in proper position.

The detachable connections 16 of the supporting strap 15 engage substantially laterally extending portions 11' of the bail member 11 so that when there is any undue or excessive strains or pulls upon the supporting strap, the junction member, or any of the associated parts, a substantially lateral pull will be exerted upon the legs of the bail member to disengage the same from the recesses 14 of the junction member. Thus, if the cow's foot becomes engaged in any of these parts the bail member will become automatically disengaged from the junction member and release the cow's foot and prevent any damage to the several parts.

The junction member is provided with a plurality, here shown as four, of nipples 17, all of which communicate with a longitudinal passageway 18 formed in the junction member.

The junction member is provided with a lower discharge nipple 19 and with a laterally extending discharge nipple 20, both of which communicate with the passageway 18 formed therein.

With this arrangement, one or the other of the discharge nipples 19 or 20 may be closed by means of a cap 21, and a hose 22 may be connected to the other nipple to convey the milk from the junction member to a pail or container 23.

If but one cow is being milked, the lateral discharge nipple 20 will be closed and the hose 22 will be attached to the lower discharge nipple 19. If, however, two cows are being simultaneously milked, the pail 23 will be placed between the two cows and two of the junction members will be connected to the container by hose connections 22, such as suggested in Figure 1 of the drawing. The lateral discharge nipple 20 is arranged in a downwardly inclined position, and by changing the bail 11 to engage either of the pair of opposed recesses 14, the hose connection 22 may be directed toward the head or toward the tail of the cow.

The container or pail 23 will be provided with a plurality, here shown as two, of inlet nipples or connections 24 for engagement with the hose connection 22 and a vent 25 will be provided in the cover 26 which carries the inlet nipple connections 24.

As shown probably best in Figure 2, each teat tube 27 is provided with a longitudinally extending passageway, the teat tube being provided with openings at both ends. The end which is inserted in the teat is preferably beveled, as shown at 28, to facilitate insertion in the teat passage and also to provide an opening of large area to receive the milk.

Adjacent its other end, each teat tube is formed with an annular flange or the like 29 constituting an abutment which engages the end of the teat when the teat tube has been inserted a sufficient distance. The outer surface of each teat tube is provided, at a point spaced from the abutment 29, with an annular enlargement 30. This enlargement, when the tube is inserted, passes the muscles of the teat that surround the lower end thereof and by reason of the normal contraction of these muscles below the enlargement 30, the teat tube 27 is held in place.

A hose 31 is connected to the lower end of each teat tube and with one of the nipples 17 of the junction member 10.

With this arrangement, milk from the bag or udder will flow by gravity without any manipulation of the teat and will, as a consequence, flow through the junction member and into the container.

When the milking device is not in use, or when the same is being attached to a cow, the tubes 31 are interfolded or interlaced, as shown in Figure 4. As illustrated in this figure, one of the tubes 31 may be inserted through the ring portion 12 of the bail 11 and then another tube 31 passed through the loop thus formed in the first tube, and the remaining tubes successively passed through the loop of the previously looped tube, as will be obvious. In this folded position, the junction member 10, with the four attached teat tubes and the hose connections, can be more readily handled and can be attached to the cow's back without the uncontrolled teat tubes coming into engagement with its body.

The straight passageways through the teat tubes permit the same to be readily cleaned and sterilized, and in a like manner the construction of the junction member 10 permits the same to be readily cleansed by passing a brush through the nipple passages thereof.

In use, this device has been found to give entirely satisfactory results with a complete discharge of the milk from the bag or udder.

Various modifications may suggest themselves to those skilled in this art, and to this end reservation is made to make such changes as may come within the purview of the accompanying claims.

What I claim as my invention is:

1. In a milking device, a junction member provided with a plurality of nipples for connection with teat tubes, a bail member having resilient leg portions engaging opposed recesses in said junction member and releasable therefrom upon a spreading of said legs, and a supporting strap engaging said resilient leg portions for spreading the same upon an excessive pull upon said supporting strap or junction member.

2. In a milking device, a junction member provided with a plurality of nipples for connection with teat tubes, a bail member formed of a resilient material having opposed ends adapted to snap into engagement with opposed recesses formed in said junction member and detachable therefrom upon a spreading of said ends, and a supporting strap connected to substantially laterally extending portions of said bail member for spreading said ends upon an excessive pull upon said supporting strap or junction member.

3. In a milking device, a junction member provided with a plurality of nipples for connection with teat tubes and provided with a pair of opposed recesses, a bail member formed with a pair of resilient legs terminating in opposed end portions adapted to snap into said opposed recesses and disengageable therefrom upon spreading of said legs, and a supporting strap having its ends connected to said legs to spread the legs upon an excessive pull upon said supporting strap or junction member.

4. In a milking device, a junction member provided with a plurality of nipples for connection with teat tubes, a discharge nipple on said junction member, said junction member being provided with a pair of opposed recesses, a bail member provided with a pair of resilient legs terminating in opposed ends adapted to be snapped into engagement with said recesses to detachably connect said bail member to said junction member, said bail member being provided with a ring portion intermediate said legs through which a teat tube may be inserted, and a supporting strap having its ends connected to substantially laterally extending portions of said legs adapted to spread said legs upon excessive pull upon said supporting strap or junction member to disengage said bail member from said junction member.

REX S. BENSON.